United States Patent
Marsat et al.

(10) Patent No.: US 12,503,532 B2
(45) Date of Patent: Dec. 23, 2025

(54) RUBBER COMPOSITION AND TRUCK TIRE

(71) Applicant: The Goodyear Tire & Rubber Company, Akron, OH (US)

(72) Inventors: Jean-Noel Marsat, Hagen (LU); Marine Sophie Francoise Wassen, Mersch (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 17/815,584

(22) Filed: Jul. 28, 2022

(65) Prior Publication Data

US 2024/0034820 A1 Feb. 1, 2024

(51) Int. Cl.
| | |
|---|---|
| C08F 136/08 | (2006.01) |
| B60C 1/00 | (2006.01) |
| C08C 19/22 | (2006.01) |
| C08C 19/25 | (2006.01) |
| C08F 136/06 | (2006.01) |
| C08K 3/04 | (2006.01) |
| C08K 3/36 | (2006.01) |
| C08K 5/548 | (2006.01) |

(52) U.S. Cl.
CPC .......... *C08F 136/08* (2013.01); *B60C 1/0016* (2013.01); *C08C 19/22* (2013.01); *C08C 19/25* (2013.01); *C08F 136/06* (2013.01); *C08K 3/04* (2013.01); *C08K 3/36* (2013.01); *C08K 5/548* (2013.01); *B60C 2200/06* (2013.01); *C08K 2201/006* (2013.01)

(58) Field of Classification Search
CPC .... C08F 136/08; C08F 136/06; B60C 1/0016; B60C 2200/06; C08C 19/22; C08C 19/25; C08K 3/04; C08K 3/36; C08K 5/548; C08K 2201/006
See application file for complete search history.

(56) References Cited

U.S. PATENT DOCUMENTS

| | | | |
|---|---|---|---|
| 5,015,692 A * | 5/1991 | Takao | ..................... C08C 19/42 525/209 |
| 5,336,730 A | 8/1994 | Sandstrom et al. | |
| 8,695,662 B2 | 4/2014 | Braun et al. | |
| 11,267,955 B2 | 3/2022 | York et al. | |

(Continued)

FOREIGN PATENT DOCUMENTS

| | | | |
|---|---|---|---|
| EP | 1254786 A1 | 11/2002 | |
| EP | 1452344 A1 | 9/2004 | |
| JP | 2005-047968 | * | 2/2005 |

OTHER PUBLICATIONS

Translation of JP 2005-047968 (Year: 2005).*
Extended European Search Report for Application No. 23188200.2, dated Nov. 29, 2023.

*Primary Examiner* — Robert C Boyle
(74) *Attorney, Agent, or Firm* — Mandy B. Willis

(57) ABSTRACT

The present invention is directed to a rubber composition for a truck tire, the rubber composition comprising 70 phr to 95 phr of polyisoprene, 5 phr to 30 phr of a polybutadiene rubber having a cis content of less than 60% and being functionalized for the coupling to silica, as well as 40 phr to 80 phr of a filler comprising predominantly silica. Furthermore, the present invention is also directed to a tire comprising such a rubber composition and a truck with said tire.

18 Claims, 1 Drawing Sheet

(56) References Cited

U.S. PATENT DOCUMENTS

| | | | |
|---|---|---|---|
| 2005/0004297 A1* | 1/2005 | Durel | C08K 5/548 |
| | | | 524/493 |
| 2007/0037917 A1 | 2/2007 | Sandstrom | |
| 2012/0053286 A1 | 3/2012 | Zhao et al. | |
| 2014/0196827 A1* | 7/2014 | Besson | B60C 9/18 |
| | | | 152/535 |
| 2014/0275331 A1 | 9/2014 | Kondo | |
| 2015/0283854 A1* | 10/2015 | Saintigny | B60C 11/0008 |
| | | | 524/313 |
| 2022/0411613 A1 | 12/2022 | Eichhorst et al. | |

* cited by examiner

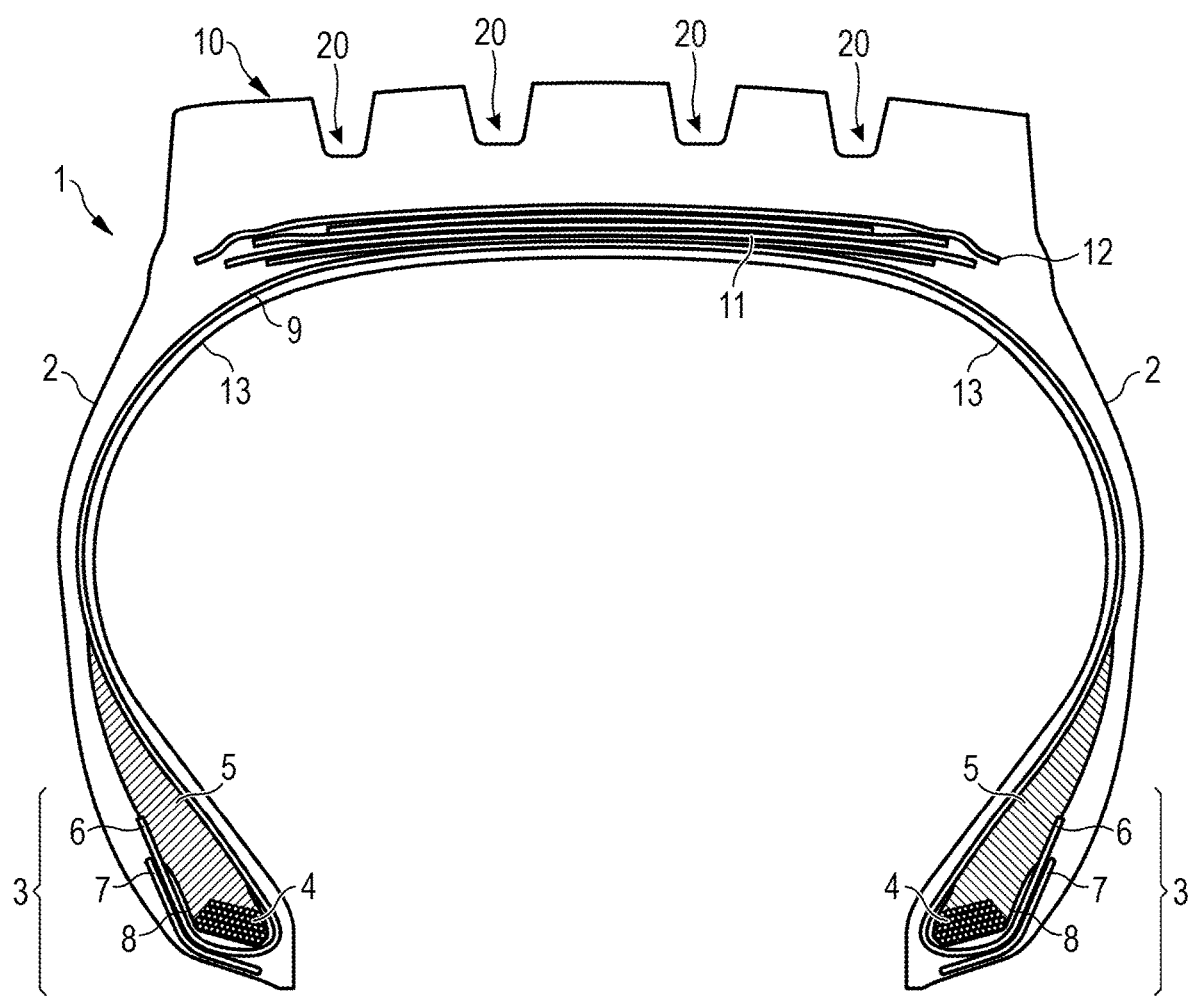

RUBBER COMPOSITION AND TRUCK TIRE

FIELD OF THE INVENTION

The present invention is directed to a rubber composition, in particular for a tire, such as a truck tire. Furthermore, the present invention is directed to a tire comprising such a rubber composition. Moreover, the present invention is directed to a truck, in particular a semi-trailer truck having a truck and a semi-trailer, the truck comprising a tire with said rubber composition in its tread.

BACKGROUND OF THE INVENTION

Semi-trailer trucks are transporting a majority of goods on land. In view of sustainability and environmental aspects, it is desirable that such trucks including their trailers are equipped with tires having limited abrasion and/or rolling resistance. Limited abrasion reduces also maintenance time for the truck and/or trailer which allows to operate a fleet more efficiently and with a reduced number of vehicles and/or trailers. While there have been developments in this field over the past years, significant room for improvement remains.

SUMMARY OF THE INVENTION

One object of the present invention may be to provide a rubber composition, in particular for a truck tire which has good wear properties.

Another object of the present invention may be to provide a rubber composition for a truck tire with improved rolling resistance.

Yet another object of the present invention may be a combination of the above mentioned objects.

The present invention is defined by the scope of independent claim 1. Further embodiments are provided in the dependent claims and the summary herein below.

Thus, in a first aspect, the present invention is directed to a rubber composition, in particular for a truck tire, the rubber composition comprising 70 phr to 95 phr of polyisoprene, 5 phr to 30 phr of a polybutadiene rubber having a cis content of less than 60% (preferably less than 50% and/or more than 30%) and being functionalized for the coupling to silica, and 40 phr to 80 phr of a filler comprising predominantly silica. The inventors have found that such a combination of a low cis functionalized polybutadiene rubber with silica as a main filler results in good rolling resistance and abrasion properties.

In one embodiment, the rubber composition comprises from 45 phr, preferably 50 phr to 75 phr, preferably to 65 phr or to 60 phr of silica. Such a silica range has been found to be most preferable by the inventors to provide a good balance between stiffness, wet grip and heat generation.

In another embodiment, said silica has a BET surface area of at least 190 $m^2/g$, preferably of at least 200 $m^2/g$; and/or of at most 350 $m^2/g$, or even more preferably of less than 300 $m^2/g$.

In still another embodiment, the rubber composition comprises less than than 10 phr of carbon black. Preferably, the amount of carbon black in the present composition is low.

In still another embodiment, the rubber composition comprises from 0 phr, preferably 0.1 phr to 6 phr, preferably 4 phr of carbon black. A main task of the carbon black may be to provide the tire with a black color.

In still another embodiment, the polybutadiene rubber has one or more of i) at least one amino silane group, ii) at least one amino siloxane group, and iii) at least one amino silanol group. One or more of these groups have been found to be most desirable for the coupling to silica in the present composition. The functional groups could be in-chain, pendant or provided at one or more chain ends. In a preferred embodiment, the polybutadiene rubber is end-chain functionalized.

In still another embodiment, the polybutadiene rubber has a glass transition temperature within a range of −80° C. to −98° C., preferably to −95° C. Such a relatively high Tg range for a polybutadiene is preferred in the present case.

In still another embodiment, the polybutadiene rubber has a vinyl content within a range of 5% to 30%, preferably 5% to 20%; and/or a weight average molecular weight within a range of 200 k g/mol to 700 k g/mol, preferably 250 k g/mol to 450 k g/mol.

In still another embodiment, the rubber composition comprises from 75 phr to 90 phr of polyisoprene; and/or from 10 phr to 25 phr of the polybutadiene rubber.

In still another embodiment, the polyisoprene consists of more than 80%, preferably 90%, natural rubber, measured by weight. The remaining part can for instance include synthetic polyisoprene. It also possible and even more preferable that the polyisoprene consists of natural rubber.

In yet another embodiment, the rubber composition comprises from 2 phr to 15 phr of a resin selected from terpene resins and terpene phenol resins.

In still another embodiment, the resin has a softening point of at least 105° C., preferably of at least 125° C., or even more preferably of at least 145°. Preferably the softening point is at most 190° C., or even more preferably at most 165° C.

In a preferred embodiment, the resin is a terpene phenol resin having a softening point within a range of 125° C. to 190° C. Such a resin has been found to provide a preferred wet traction with limited impact on rolling resistance.

In still another embodiment, the terpene phenol resin has an aromatic proton content/aromaticity within a range of 5% to 15%, preferably within a range of 5% to 10%, as determined by NMR.

In still another embodiment, said resin has a weight average molecular weight Mw of less than 1000 g/mol, preferably within a range of 500 g/mol to 1000 g/mol.

In another embodiment, the rubber composition further comprises a silane within a range of 5 phr to 10 phr.

In yet another embodiment, the rubber composition comprises a silane within a range of 10 phf to 20 phf, wherein "phf" means parts by 100 parts of filler, all by weight. This unit as such is also well-known to the person skilled in the art. Fillers include for instance silica and carbon black and/or further fillers known to the person skilled in the art.

In yet another embodiment, the silane is one or more of: i) a sulfur containing silane (the silane molecules comprising one or more sulfur atoms); ii) a sulfur donor (this term as such is known to the person skilled in the art, wherein, e.g., the silane may provide one or more sulfur atoms per silane molecule for cross linking polymer chains of the rubber, such as of the polyisoprene and/or diene based rubber); and iii) one or more of tetrasulfide silanes and mercapto silanes. Said mercapto silane may be an unblocked or blocked mercapto silane. An example of the tetrasulfide silane is bis-triethoxysilylpropyl tetrasulfide. Example mercapto silanes include trialkoxymercaptoalkyl-silane (unblocked) and 3-Octanoylthio-l-propyltriethoxysilane (blocked).

In an embodiment, the rubber composition is a sulfur curable or sulfur cured rubber composition.

In another embodiment, the rubber composition comprises one or more of i) less than 10 phr of a styrene butadiene rubber, preferably less than 6 phr or less than 4 phr of styrene butadiene rubber; ii) less than 10 phr of resin, preferably less than 9 phr of resin but optionally more than 1 phr of the resin; iii) less than 10 phr of oil, preferably less than 9 phr of oil or less than 4 phr of oil; and iv) from 0 phr, preferably from 0.1 phr to 6 phr, or preferably to 4 phr of carbon black.

In an embodiment, the rubber composition may include at least one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

In another embodiment, an emulsion polymerization derived styrene/butadiene (ESBR) might be used having a styrene content of 20 to 28 percent bound styrene or, for some applications, an ESBR having a medium to relatively high bound styrene content, namely, a bound styrene content of 30 to 45 percent. In many cases the ESBR will have a bound styrene content which is within the range of 26 to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene. In addition or alternatively, the SSBR or other diene based rubber may be functionalized with one or more of at least amino, silane, siloxane, silanol group.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher.

In one embodiment, additional cis-1,4-polybutadiene rubber (BR or PBD) is used. Polybutadiene rubbers can be prepared, for example, by organic solution polymerization of 1,3-butadiene. Polybutadiene rubbers are available commercially, such as Budene® 1207, Budene® 1208, Budene® 1223, or Budene® 1280 from The Goodyear Tire & Rubber Company. Such high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference. A low cis BR can be manufactured using a lithium catalyst. Low cis BRs are also commercially available such as KBR820 from Kumho Petrochemical. A cis content can be determined by NMR.

A glass transition temperature, or Tg, of an elastomer represents the glass transition temperature of the respective elastomer in its uncured state. A glass transition temperature of an elastomer composition represents the glass transition temperature of the elastomer composition in its cured state. A Tg is determined as a peak midpoint by a differential scanning calorimeter (DSC) at a temperature rate of increase of 20° C. per minute, according to ASTM D3418 or equivalent.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR. In another example, the composition may include less than 5 phr, preferably less than 3, phr of an additional diene-based rubber or be also essentially free of such an additional diene-based rubber. The terms "compound" and "composition" and "formulation" may be used herein interchangeably, unless indicated otherwise. The terms "rubber" and "elastomer" may also be used herein interchangeably.

Molecular weights of elastomers/rubbers/resins, such as Mn (number average molecular weight), Mw (weight average molecular weight) and Mz (z average molecular weight), are determined herein using gel permeation chromatography (GPC) according to ASTM 5296-11 using polystyrene calibration standards, or equivalent.

In another embodiment, the rubber composition includes a resin, preferably having a glass transition temperature Tg greater than 20° C. A Tg for resins is determined as a peak midpoint by a differential scanning calorimeter (DSC) at a temperature rate of increase of 10° C. per minute, according to ASTM D6604 or equivalent. Preferably, the resin has a softening point above 70° C. as determined by ASTM E28 which might sometimes be referred to as a ring and ball softening point.

In another embodiment, the resin is selected from the group consisting of coumarone-indene resin, petroleum hydrocarbon resin, terpene polymers/resins, styrene/alphamethylstyrene resins, terpene phenol resin, rosin derived resins and copolymers and/or mixtures thereof.

A coumarone-indene resin preferably contains coumarone and indene as monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cyclopentadiene, and diolefins such as isoprene and piperlyene. Coumarone-indene resins have preferably softening points ranging from 10° C. to 160° C. (as measured by the ball-and-ring method). Even more preferably, the softening point ranges from 30° C. to 100° C.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above, and are known as C5/C9 copolymer resins. Petroleum resins are typically available with softening points ranging from 10° C. to 120° C. Preferably, the softening point ranges from 30 to 100° C.

In an embodiment, C5 resins are aliphatic resins made from one or more of the following monomers: 1,3-pentadiene (e.g., cis or trans), 2-methyl-2-butene, cyclopentene, cyclopentadiene, and dicyclopentadiene.

In another embodiment, a C9 resin is a resin made from one or more aromatic monomers, preferably chosen from the group of indene, methylindene, vinyl toluene, styrene and methylstyrene (such as alpha-methylstyrene).

In still another embodiment, a C9 modified resin is a resin (such as a C5 resin) which has been modified or functionalized with one or more aromatic monomers, preferably chosen from the group of indene, methylindene, vinyl toluene, styrene and methylstyrene (such as alpha methylstyrene).

Terpene resins are preferably comprised of polymers of at least one of limonene, alpha pinene, beta pinene and delta-3-carene.

Terpene-phenol resins may be derived by copolymerization of phenolic monomers with terpenes such as limonenes, pinenes and delta-3-carene.

Representative for resins derived from rosins and derivatives thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

A styrene/alphamethylstyrene resin is considered herein to be a (preferably relatively short chain) copolymer of styrene and alphamethylstyrene with a styrene/alphamethylstyrene molar ratio in a range of about 0.05 to about 1.50. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely its styrene and alphamethylstyrene contents and by its glass transition temperature, molecular weight and molecular weight distribution.

In one embodiment, said resin is partially or fully hydrogenated.

In an embodiment, the rubber composition comprises oil, such as processing oil. Oil may be included in the rubber composition as extending oil typically used to extend elastomers. Oil may also be included in the rubber composition by addition of the oil directly during rubber compounding. Oil used may include both extending oil present in the elastomers, and (process) oil added during compounding. Suitable oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils.

Glass transition temperatures Tg for oils are determined as a peak midpoint by a differential scanning calorimeter (DSC) at a temperature rate of increase of 10° C. per minute, according to ASTM E1356, or equivalent.

In an embodiment, the rubber composition comprises silica. Silica may be for instance pyrogenic/fumed or precipitated silica. In preferred embodiments, precipitated silica is used. Silicas might be characterized, for example, by having a BET surface area, as measured using nitrogen gas. The BET surface area is determined according to ASTM D6556 or equivalent and is described in the Journal of the American Chemical Society, Volume 60, Page 304 (1930). BET surface areas can, for example, be within a range of 120 m²/g to 350 m²/g herein.

In still another embodiment, the rubber composition may comprise pre-silanized and/or hydrophobated silica.

In an alternative embodiment, the pre-hydrophobated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the silica with the silica coupling agent in situ within the rubber. For example, see U.S. Pat. No. 7,214,731, the teachings of which are incorporated herein for the purpose of describing pre-hydrophobated silica and techniques for making such pre-hydrophobated silica.

In another embodiment, said pre-silanized silica is silica pre-reacted with a silica coupler comprised of bis(3-triethoxysilylpropyl)polysulfide containing an average of from 1 to 5 connecting sulfur atoms (preferably 2 to 4) in its polysulfidic bridge or an alkoxyorganomercaptosilane. The mercaptosilane with its SH groups may improve compatibility with the rubber material or rubber matrix and/or support the curing process. The amount mercapto groups on the surface of the silica may be in the range of between 0.1 and 1 weight percent, alternatively 0.4 to 1 weight percent or 0.4 to 0.6 weight percent.

In addition to mercapto groups coupled to the silica, the silica can comprise a compatibilizer which is typically a (hydro-)carbon chain material having multiple carbon atoms (for instance at least 4 carbon atoms) along its chain. Such a compatibilizer may facilitate the mixing of the composition. In an example, the weight % of carbon surface load/functionalization is between 2 and 10, or alternatively between 3 and 8.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 cm³/100 g to 150 cm³/100 g. Iodine absorption values are determined according to ASTM D1510 or equivalent.

In other embodiments, the content of carbon black is at most 10 phr, preferably less than 8 phr or less than 4 phr.

Typically, the carbon black content is at least 0.1 phr.

In another embodiment, other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534; 6,207,757, 6,133,364, 6,372,857, 5,395,891, or 6,127,488, and a plasticized starch composite filler including but not limited to that disclosed in U.S. Pat. No. 5,672,639.

In one embodiment, the rubber composition may contain sulfur containing organosilicon compounds or silanes. Examples of suitable sulfur containing organosilicon compounds are of the formula:

$$Z—Alk—S_n—Alk—Z \qquad I$$

in which Z is selected from the group consisting of

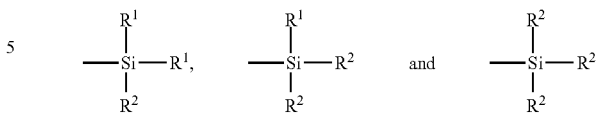

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

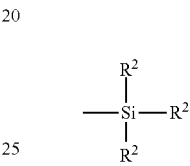

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire (or in other words tire components). For example, the rubber component may be a tread (including tread cap and/or tread base), sidewall, apex, chafer, sidewall insert, wirecoat or innerliner. The preferred application is in this case a tread.

In a second aspect, the present invention is directed to a tire, in particular a tire for a truck or a truck tire, the tire comprising the rubber composition in accordance with the first aspect or one or more of its embodiments.

In one embodiment, the tire has a tread, the tread and/or a radially outermost portion of the tread comprises the rubber composition of claim 1.

In another embodiment, the tire is a 22.5 inch (truck) tire.

In another embodiment, the tire has at least four belts which are optionally reinforced by a plurality of metal cords, such as steel cords.

In another embodiment, the tire comprises a steel cord reinforced carcass ply.

The tire of the present invention may for example be a pneumatic tire or nonpneumatic tire. The tire may also be a radial or bias tire.

Vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In a third aspect, the present invention is directed to a truck and/or a truck trailer comprising at least one tire according to the second aspect of the invention or one of its embodiments.

In one embodiment, the truck is a semi-trailer truck comprising a truck and a semi-trailer, wherein the semi-trailer truck comprises the at least one tire.

BRIEF DESCRIPTION OF THE DRAWINGS

The invention will be described by way of example and with reference to the accompanying drawing in which:

FIG. 1 is a cross-sectional view of a truck tire perpendicular to the equatorial plane of the tire, in accordance with an embodiment of the invention.

DETAILED DESCRIPTION OF THE INVENTION

FIG. 1 is a schematic cross-section of a truck tire 1 according to an embodiment of the invention. The tire 1 has a plurality of tire components such as a tread 10, an innerliner 13, a belt portion comprising four belts or belt plies 11, a carcass ply 9, two sidewalls 2, two bead regions 3, bead filler apexes 5 and beads 4. The example tire 1 is suitable, for example, for mounting on a rim of a truck. As shown in FIG. 1, the belt plies 11 may be covered by an overlay ply 12 and/or may include one or more breaker plies. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axially outer surfaces of two flippers 8 and axially inner surfaces of two chippers 7 which are also considered as tire components. As shown in FIG. 1, the example tread 10 may have circumferential grooves 20, each groove 20 essentially defining a U-shaped opening in the tread 10. The main portion of the tread 10 may be formed of one or more tread rubber compounds.

While the embodiment of FIG. 1 suggests a plurality of tire components including for instance apexes 5, chippers 7, flippers 8 and overlay 12, such and further components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance a different number of grooves 20, e.g. less than four grooves.

The rubber composition in accordance with a preferred embodiment of the invention is used in the tread or tread layer contacting the ground or road. In an embodiment, the tread 10 of the tire 1 comprises a rubber composition according to an Inventive Example as identified in Table 1 below. Table 1 shows the comparison of a rubber compound according to the Inventive Example with a Comparative Example (which is not in accordance with the present invention). A main difference of the Inventive Example in view of the Comparative Example is the use of a low cis polybutadiene rubber, which is functionalized for the coupling to silica, instead of a high cis polybutadiene rubber. Both compositions may optionally comprise small amounts of carbon black, e.g., of below 4 phr, which are not listed herein.

TABLE 1

| Ingredients | Comparative Example (phr) | Inventive Example (phr) |
|---|---|---|
| Natural rubber | 85 | 80 |
| Polybutadiene 1[1] | 15 | 0 |
| Polybutadiene 2[2] | 0 | 20 |
| Silica[3] | 52 | 54 |
| Resin 1[4] | 4 | 0 |
| Resin 2[5] | 0 | 5 |
| Silane[6] | 6.3 | 7.1 |
| Stearic Acid | 3 | 3 |
| Waxes | 1 | 2 |
| Antidegradants[7] | 4 | 4 |
| Zinc Oxide | 3 | 3 |
| Sulfur | 1.4 | 1.2 |
| Accelerator 1[8] | 3.1 | 2.7 |

[1]high cis 1,4 polybutadiene as Buna ™ CB 25 from Arlanxeo
[2]functionalized low cis polybutadiene rubber having about 40.5% of cis content and from about 10% to about 14% of vinyl content, as KBR 820 from Kumho Petrochemical
[3]Zeosil ™ Premium 200MP from Solvay
[4]Polyterpene resin based on beta-pinenes as Sylvatraxx ™ 4150 from Kraton, with a softening point of about 115° C.
[5]Terpenephenol resin having a softening point of about 160° C. as Polyster T160 from Yasahura Chemicals
[6]TESPT as SI-69 from Evonik
[7]Dihydroquinoline and phenylenediamine types
[8]CBS As shown below in Table 2, laboratory test abrasion of the rubber composition according to the Inventive Example has decreased significantly by more than 30%.

Furthermore, the rolling resistance indicators "tangent delta" and "hot rebound" have been improved as well. In particular, the tangent delta indicator has been improved by about 15% over the Comparative Example and the rebound indicator has improved by about 5% over the Comparative Example.

Overall, abrasion and rolling resistance, which are important properties in view of sustainability and limited energy consumption, have been significantly improved.

TABLE 2

| Properties | Comparative Example | Inventive Example |
|---|---|---|
| Grosch Abrasion [a] [mg/km] | 1165 | 814 |
| Tangent Delta 10% [b] | 0.069 | 0.060 |
| Rebound at 100° C. [c] [%] | 75.8 | 79.7 |

[a] Determined with a LAT100 Grosch abrasion tester
[b] Tangent delta has been obtained with an RPA 2000 ™ Rubber Process Analyzer of the company Alpha Technologies, based on ASTM D5289 or equivalent, at 10% strain.
[c] Rebound is measured on a Zwick Roell ™ 5109 rebound resilience tester according to DIN 53512 at the given temperature.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tread of a semi-trailer truck tire being formed of a rubber composition, the rubber composition comprising:
   70 phr to 95 phr of polyisoprene;
   5 phr to 30 phr of a low cis polybutadiene rubber produced using a lithium catalyst, the polybutadiene rubber having a cis content of less than 60% and being functionalized for coupling to silica;
   optionally a styrene butadiene rubber, wherein the styrene butadiene rubber being present in less than 10 phr;
   2 phr to 15 phr of a resin selected from terpene resins and terpene phenol resins having a softening point of at least 105° C.; and,
   40 phr to 80 phr of a filler comprising predominantly silica having a BET surface area of at least 190 m²/g.

2. The rubber composition of claim 1, comprising from 45 phr to 75 phr of silica.

3. The rubber composition of claim 2, comprising more than 50 phr of silica and less than 65 phr of silica.

4. The rubber composition of claim 1, comprising less than 10 phr of carbon black.

5. The rubber composition of claim 1, comprising from 0.1 phr to 4 phr of carbon black.

6. The rubber composition of claim 1, wherein the polybutadiene rubber has one or more of: i) at least one amino silane group, ii) at least one amino siloxane group, and iii) at least one amino silanol group.

7. The rubber composition of claim 1, wherein the polybutadiene rubber has a glass transition temperature within a range of −80° C. to −98° C.

8. The rubber composition of claim 7, wherein the polybutadiene rubber has a glass transition temperature within a range of −80° C. to −95° C.

9. The rubber composition of claim 1, wherein the rubber composition comprises one or more of:
   from 75 phr to 90 phr of polyisoprene;
   from 10 phr to 25 phr of the polybutadiene rubber.

10. The rubber composition of claim 1, wherein the resin has a softening point of at least 105° C.

11. The rubber composition of claim 1, wherein the resin is a terpene phenol resin having a softening point within a range of 125° C. to 190° C.

12. The rubber composition of claim 1, further comprising a silane within a range of 5 phr to 10 phr.

13. The rubber composition of claim 12, wherein the silane is one or more of:
   i) a sulfur containing silane;
   ii) a sulfur donor;
   iii) one or more of tetrasulfide silanes and mercapto silanes.

14. The rubber composition of claim 1, wherein the composition comprises one or more of:
   i) less than 4 phr of a styrene butadiene rubber;
   ii) less than 10 phr of oil.

15. A tire for a truck, the tire comprising the rubber composition of claim 1.

16. The tire of claim 15, wherein the rubber composition is incorporated a radially outermost portion of the tread.

17. The tire of claim 15, wherein the tire is a 22.5 inch truck tire.

18. A semi-trailer truck comprising a truck and a semi-trailer, the semitrailer truck comprising at least one tire in accordance with claim 16.

* * * * *